(12) United States Patent
Nishiwaki

(10) Patent No.: US 6,307,827 B1
(45) Date of Patent: Oct. 23, 2001

(54) OPTICAL DEVICE AND INFORMATION RECORDING AND REPRODUCING DEVICE

(75) Inventor: Seiji Nishiwaki, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/141,211

(22) Filed: Aug. 27, 1998

(30) Foreign Application Priority Data

Aug. 29, 1997 (JP) .................................... 9-234319

(51) Int. Cl.$^7$ ........................................ G11B 7/00
(52) U.S. Cl. .................. 369/112.07; 369/112.12; 369/112.27
(58) Field of Search ............... 369/112, 44.23, 369/126, 44.14, 109, 13, 44.12, 110, 111, 112.27, 112.07, 112.12; 250/216; 359/368; 385/31, 29, 33, 37

(56) References Cited

U.S. PATENT DOCUMENTS

| | | | |
|---|---|---|---|
| 4,991,919 | * 2/1991 | Nishiwaki et al. | 369/44.12 |
| 5,272,330 | * 12/1993 | Betzig et al. | 250/216 |
| 5,734,632 | * 3/1998 | Ito et al. | 369/44.34 |
| 5,883,872 | * 3/1999 | Kino | 369/112 |
| 5,946,281 | * 8/1999 | Ito et al. | 369/112 |

FOREIGN PATENT DOCUMENTS 5-34129    2/1993  (JP) .

OTHER PUBLICATIONS

S. Hosaka et al. "Fabrication of nanostructures using scanning probe microscopes" *J. Vac. Sci. Technol.* vol. 13, No. 6, pp. 2813–2818.

* cited by examiner

*Primary Examiner*—David Hudspeth
*Assistant Examiner*—Kim-Kwok Chu
(74) *Attorney, Agent, or Firm*—Merchant & Gould P.C.

(57) ABSTRACT

An optical device and an information recording and reproducing device, which comprise a radiation source, a transparent substrate, a waveguide layer provided on the surface of the transparent substrate opposite to the radiation source and an optical coupling means that is provided on the surface of the waveguide layer or on the interface between the transparent substrate and the waveguide layer and that has a concentric circular periodic structure with an optical axis of the radiation source in the center; wherein the waveguide layer has a cutoff part at the center of the periodic structure; the light from the radiation source excites a guided light that propagates from the periphery to the center of the periodic structure in the waveguide layer by the optical coupling means; and a part of the guided light leaks out, at the cutoff part, to a signal surface on a flat substrate provided adjacent to the waveguide layer. With such a structure, an optical device and an optical information recording and reproducing device can greatly improve the coefficiency of light utilization and largely enhance the signal reproducing sensitivity.

72 Claims, 10 Drawing Sheets

OPTICAL DEVICE AND INFORMATION RECORDING AND REPRODUCING DEVICE

FIELD OF THE INVENTION

The present invention relates to a device capable of recording or reproducing high density information, or to an optical device that irradiates subjects with microscopic spots of light.

BACKGROUND OF THE INVENTION

A conventional information recording and reproducing device, for example, an SNOM (Scanning Near-Field Optical Microscope), which is described in J. Vac. Sci. technol. B13 (1995) 2813 by S. Hosaka et al., will be explained. FIG. 9 is a cross sectional view showing a structure of a conventional information recording and reproducing device. In FIG. 9, an optical fiber comprises a core 25 having a high refractive index and a clad 26 having a low refractive index surrounding the core. The tip of the cone 25 is sharpened in a conical shape. The clad 26 and a reflective film 27 are formed in a manner in which they surround the sharpened cone. The tip of this cone part faces to a recording film 14 provided on a disc substrate 13 with a small gap δ.

The gap δ is 50 nm or less. The diameter of the tip of the cone part is about 0.1 μm. When light from aradiation source enters the optical fiber, an evanescent light 29 leaks out from the tip of the cone part. Since the tip is adjacent to the recording film 14, if the recording film 14 is a phase changeable film, a signal mark 19 having a reflectance that is different from that of surroundings can be formed on the recording film by the thermal energy of the evanescent 29. Moreover, the signal marks 19 can be confirmed by detecting a reflected scattered light 30 from the recording film 14 by a photo detector 31.

Such an information recording and reproducing device enables to record and reproduce signals corresponding to the core's diameter of the tip. Thus, if the diameter of the signal mark 19 is 0.1 μm, an information recording and reproducing device having at least 9 times higher density than a digital video disc (DVD) (the diameter of the signal mark is about 0.3 to 0.4 μm) can be provided.

The conventional information recording and reproducing device has problems, for example, those shown in FIG. 10A and FIG. 10B. FIG. 10A shows a main part of the conventional information recording and reproducing device. FIG. 10B is a graph showing a distribution of light energy along the direction of light propagation (−z axis) of the device.

In FIG. 10A, a guided light 28 propagates in the optical fiber without substantial loss until it reaches the cone part (z>a). In the cone part (a>z>0), however, an incident light 28a is divided into a refracted light 28b and a reflected light 28c, and further the reflected light 28c is divided into a refracted light and a reflected light. The reflected light divided repeatedly along the length, that is a, of the cone part. Consequently, the evanescent light 29 radiated from the tip of the cone part is extremely weakened.

In general, if the light energy of the guide light before the cone part is 1, the light energy η of the evanescent light 29 released from the tip of the cone part is said to be about $10^{-7}$ to $10^{-6}$. As shown in FIG. 10B, the coefficient of light utilization is extremely bad. Therefore, it takes a long time for recording on the recording film 14. Thus, the conventional device has a great shortcoming in terms of information transmitting rate, though the high density recording can be achieved.

Moreover, the tip (head) of the cone part is like a dot floating in space. Therefore, heat is liable to converge on the head and deterioration due to a thermal damage can readily occur. Furthermore, in order to stably scan the head while bringing it closer to the recording face 14, a complex mechanism is required. Furthermore, since the track on the recording film cannot be recognized, it is difficult to realize high density in the track direction.

In addition, in the reproducing principle using the reflected scattered light 30, only a small part of the reflected scattered light extending broadly in space is detected. Therefore, reproducing sensitivity is extremely poor.

SUMMARY OF THE INVENTION

It is therefore an object of the present invention to provide an optical device and an information recording and reproducing device in which the coefficiency of light utilization is greatly improved, the deterioration due to thermal damage is inhibited, the device head can stably be scanned while being brought closer to the signal surface, the track on the signal surface can be recognized and controlled, and the signal reproduction sensitivity can be greatly enhanced.

In order to achieve the above mentioned object, according to the first aspect of the present invention, an optical device and an information recording and reproducing device comprise a radiation source, a transparent substrate, a waveguide layer provided on the surface of the transparent substrate opposite to the radiation source and an optical coupling means that is provided on the surface of the waveguide layer or on the interface between the transparent substrate and the waveguide layer and that has a concentric circular periodic structure with an optical axis of the radiation source in the center. In the device, the waveguide layer has a cutoff part at the center of the periodic structure, the light from the radiation source excites guided light propagating from the periphery to the center of the periodic structure in the waveguide layer by the optical coupling means, and a part of the guided light leaks out at the cutoff part to a signal surface of a flat substrate provided adjacent to the waveguide layer.

Thus, the transparent substrate is fixed in the same structure as the radiation source and the structure can move relative to the signal surface while being pressed against the signal surface by using a pressing means.

According to the second aspect of the present invention, an optical device and an information recording and reproducing device comprise a radiation source, a light collecting means that converts light radiated from the radiation source to parallel light, a transparent cone part having an optical axis of the parallel light as a central axis, a transparent buffer layer formed on the lower surface of the cone part, a waveguide layer formed on the buffer layer. In the device, the waveguide layer has a cutoff part at the central axis of the cone part; the refractive index of the cone part is larger than the refractive index of the waveguide layer, which is larger than the refractive index of the buffer layer; the parallel light is refracted at the surface of the cone part, passes through the buffer layer and enters the waveguide layer to excite the guided light propagating from the periphery to the center in the waveguide layer; and a part of the guided light leaks out ran at the cutoff part to the signal surface of the flat substrate provided a,adjacent to the waveguide layer.

Thus, the transparent substrate is fixed in the same structure as the radiation source and the structure can move relative to the signal surface while being pressed against the signal surface by using a pressing means.

It is preferable in the above mentioned first optical device and information recording and reproducing device of the present invention that the transparent substrate is fixed in the same structure as the radiation source, the structure moves relative to the signal surface while being pressed thereon by a pressing means, and the structure floats while facing to the signal surface having an air layer between the surface of the waveguide layer and the signal surface.

It is preferable in the above mentioned second optical device and information recording and reproducing device of the present invention that the cone part is fixed in the same structure as the radiation source, the structure moves relative to the signal surface while being pressed thereon by a pressing means, and the structure floats while facing to the signal surface having an air layer between the surface of the waveguide layer and the signal surface.

It is preferable in the above mentioned first and second optical device and information recording and reproducing device of the present invention that a first transparent layer having a refractive index that is lower than that of the waveguide layer is laminated on the waveguide layer.

It is further preferable in the above mentioned device that a reflective layer is laminated on the first transparent layer except for the cutoff part.

It is still further preferable in the above mentioned device that a mask layer that changes from opaque to transparent due to irradiation with strong light is laminated on the first transparent layer.

It is further preferable in the above mentioned device that the cutoff part is covered with a second transparent layer having a refractive index that is higher than that of the waveguide layer, and the guided light in the waveguide layer leaks out to the side of the signal surface through the second transparent layer at the cutoff part.

It is further preferable in the above mentioned device that a mask layer that changes from opaque to transparent due to irradiation with strong light is laminated on the second transparent layer.

It is further preferable in the above mentioned device that the shape of the cutoff part is at least one shape selected from the group consisting of a cone and a truncated cone each of which has the optical axis as a central axis.

It is further preferable in the above mentioned device that signal marks are recorded on the signal surface by the light that leaks out from the waveguide layer to the side of the signal surface at the cutoff part.

It is further preferable in the above mentioned device that a photo detector is provided on or in the vicinity of the transparent substrate, a part of the light leaking out from the waveguide layer to the side of the signal surface and being reflected from the signal surface is detected by the photo detector, and signals formed on the signal surface are reproduced.

It is further preferable in the above mentioned device that the photo detector is divided into equal parts by dividing lines being perpendicular to the direction in which the signal surface moves, and a differential signal between the equal parts is taken as a reproduced signal.

It is further preferable in the above mentioned device that concave and convex structure is formed on the signal surface along the direction in which the signal surface moves, the photo detector is divided into equal parts by dividing lines along the direction, and a differential signal between the equal parts is taken as a tracking control signal.

It is further preferable in the above mentioned device that concave and convex structure is formed on the signal surface along the direction in which the signal surface moves, the photo detector is divided into equal parts by dividing lines along the direction, and a differential signal between the equal parts is taken as a tracking control signal.

It is further preferable in the above mentioned device that the photo detector comprises two parts that sandwich a line being perpendicular to the direction in which the signal surface moves, and the differential signal between the two photo detectors is taken as a reproducing signal.

It is further preferable in the above mentioned device that a concave and convex structure is formed on the signal surface along the direction in which the signal surface moves, the photo detector comprises two parts being symmetric with respect to a line along the direction, and the differential signal between the two detectors is taken as a tracking control signal.

It is further preferable in the above mentioned device that the light that leaks out from the waveguide layer to the side of the signal surface at the cutoff part is reflected from the signal surface and enters the waveguide layer again to form the guided light propagating from the center to the periphery of the periodic structure in the waveguide layer, the guided light feeds back the radiation source and causes the change in the drive performance of the radiation source, the change is detected, and signals formed on the signal surface are reproduced.

It is further preferable in the above mentioned device that the waveguide layer comprises a multilayer film, and the refractive index of the guided light that propagates in the waveguide layer is substantially equal in a TE mode and TM mode.

It is further preferable in the above mentioned device that the multilayer film constituting the waveguide layer has a three-layer structure in which the transparent layer with a high refractive index is sandwiched between the transparent layers with a low refractive index.

It is further preferable in the above mentioned device that the multilayer film constituting the waveguide layer has a three-layer structure in which the transparent layer with a low refractive index is sandwiched between the transparent layers with a high refractive index.

According to the present invention, the device can generate guided light at high efficiency; collect light propagating in a state that corresponds to the guided mode without loss; and efficiently lead the light having high light energy to the signal surface as an evanescent light due to an existence of the cone part having a high refractive index. Consequently, the coefficiency of light utilization can be much improved, and information recording and reproducing at high density that exceeds the diffraction limit of light is possible while maintaining high information transmitting speed.

Moreover, since the waveguide layer moves relatively to the signal surface in the state where the pressing power is applied, the surface of the waveguide layer can float stably while maintaining the adjacent location relationship with the signal surface. With the detector provided in the vicinity of the waveguide layer, the reflected light from the signal surface or the guided light that propagates from the center to the periphery in the waveguide layer can efficiently be detected. Consequently, the signal reproducing sensitivity can largely be enhanced and the track on the signal surface can be recognized by the differential detection.

Furthermore, the structure in which the radiation part of an evanescent light has a facial extension, the thermal concentration is not liable to occur and deterioration due to a thermal damage does not occur. Moreover, with the floating scanning method in which an air layer is sandwiched between the evanescent light radiation part and the signal surface, evanescent light radiation part can stably be scanned while being brought closer to the signal surface. Thus, the structure of the device can be simplified.

Furthermore, it is possible to detect the change in the radiating condition of the evanescent light or the change in the amount of the reflected light and the light that feeds back waveguide layer by using the photo detector provided in the vicinity of the waveguide layer. Consequently, the signal reproducing sensitivity can largely be enhanced. Furthermore, since the change in the location of the radiation part of the evanescent light effects the distribution of the feedback guided light or the propagation direction, signal marks or tracks can be recognized by using the difference between the detective signals.

DETAILED DESCRIPTION OF THE INVENTION

Figure 1:
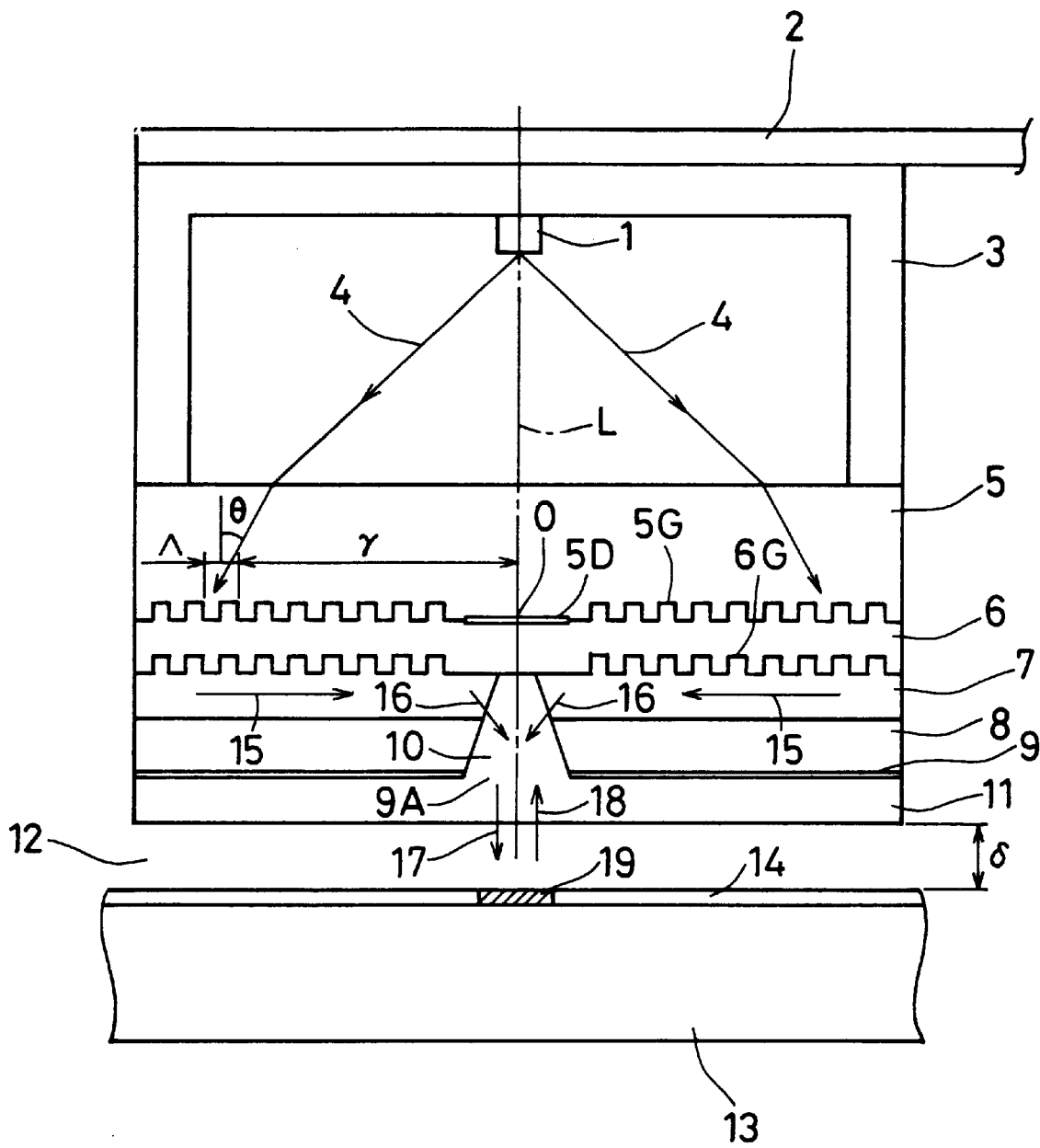
FIG. 1 is a cross sectional view showing a structure of an information recording and reproducing device of the first embodiment of the present invention.

In the above mentioned present invention, the guided light is generated only in a case where the resonance condition (input condition) is satisfied. When this condition is satisfied, a part of the input light (the light from the radiation source) is changed to a guided light. This phenomenon is referred to as "excited."

Moreover, since a part of the input light (the light from the radiation source) is changed to the guided light, integral of the guided light that is changed from the incident light at the external circumference becomes the guided light of the internal circumference. Needless to say, an optional portion where the light is guided, the input light is changed to the guided light and added to the light that has been propagated.

Moreover, in the above mentioned present invention, "the light coupling means") has a function of changing the input light (the light from the radiation source) into the guided light, or changing the guided light into the output light (radiation light).

In accordance with the above mentioned present invention, a first transparent layer having a refractive index that is lower than that of the waveguide layer is laminated on the waveguide layer. On the first transparent layer, a mask layer that changes from opaque to transparent due to irradiation with strong light may be laminated, or a reflective layer may be laminated at the location except for the cutoff part of the waveguide layer. Herein, the mask layer that changes from opaque to transparent denotes a mask comprising, for example, antimony thin film having a thickness of several tens nm. The strong light denotes a light whose light intensity is more than several $mW/\mu m^2$.

Moreover, at the cutoff part of the waveguide layer, the cutoff part is covered with the second transparent layer having a refractive index that is higher than that of the waveguide layer. The shape of the cutoff part may be a cone or a truncated cone. Moreover, the above mentioned mask layer may be formed on the second transparent layer not on the first transparent layer.

A photo detector is provided on or in the vicinity of the transparent substrate. The photo detector detects the light that leaks out at the cutoff part from the waveguide layer to the side of the signal surface and is reflected from the signal surface or the guided light that feeds back the waveguide layer and propagates from the center to the periphery of the periodical structure. Thus, signals formed on the signal surface or concave and convex structures on the signal surface are identified.

The waveguide layer comprises a multilayer film. The equivalent refractive index of the guided light that propagates in the waveguide layer is substantially equal in a TE mode and TM mode. For example, the multilayer film constituting the waveguide layer is formed in the three-layered structure in which a high refractive index transparent layer is sandwiched between low refractive index transparent layers, or in the three-layered structure in which a low refractive index transparent layer is sandwiched between high refractive index transparent layers.

A photo detector is provided on or in the vicinity of the lower surface of the cone part. The photo detector detects the light that leaks out at the cutoff part from the waveguide layer to the side of the signal surface and is reflected from the signal surface or the guided light that feeds back the waveguide layer and propagates from the center to the periphery of the periodical structure. Thus, signals formed on the signal surface or concave and convex structures on the signal surface are identified.

The waveguide layer may comprise a multilayer film and be formed so that the equivalent refractive index of the guided light that propagates in the waveguide layer is substantially equal in a TE mode and a TM mode. For example, the multilayer film constituting the waveguide layer is formed in three-layered structure in which a high refractive index transparent layer is sandwiched by low refractive index transparent layers; or in the three-layered structure in which a low refractive index transparent layer is sandwiched between high refractive index transparent layers.

First Embodiment

Hereinafter, the present invention will be described by way of the first embodiment with reference to FIGS. 1 to 3. FIG. 1 is a cross sectional view showing a structure of an information recording and reproducing device of the first embodiment of the present invention.

In FIG. 1, a radiation source 1, for example, a semiconductor laser is fixed in a holder 3 provided on the tip of a plate spring member 2. The radiation source 1 radiates the light 4 having an axis L as an optical axis. In the holder 3, a transparent parallel substrate 6 comprising, for example, a Si substrate or a quartz substrate (in a case where the wavelength of the aradiant light 4 is 1.2 $\mu$m or more, the Si substrate is also transparent) is fixed perpendicular to the optical axis L. On the opposite surface of this substrate, a photo detector SD is formed in a circular region whose diameter is several tens $\mu$m. The center of the circular region is a point O that is an intersection with the optical axis L. In the region around the photo detector 5D, the concentric circular grating 5G having a point O in the center is formed.

On the surface of the substrate 5, a waveguide layer 7 is formed in a manner in which a low refractive index transparent layer 6 comprising, for example, $SiO_2$ is sandwiched between the substrate 5 and the waveguide layer 7. Since the thickness of the transparent layer 6 is about 1 $\mu$m, convexities and concavities of the grating 5G on the substrate also appear on the interface between the transparent layer 6 and the waveguide layer 7. Thus, a grating 6G is formed.

On the waveguide layer 7, a reflective layer 9 comprising, for example, Cr is formed in a manner in which a low refractive index transparent layer 8 comprising, for example, $SiO_2$ is sandwiched between the waveguide layer 7 and the reflective layer 9. A small circular region (for example, a diameter is 0.5 $\mu$m or less) with the optical axis L of the reflective layer in the center is punched by etching, and then the base transparent layer 8 and the waveguide layer 7 are punched by dry etching or the other method. Thus, a truncated conical hole 10 with an optical axis L as a central axis is formed. Furthermore, on the reflective layer 9, a transparent layer 11 comprising, for example, Si, InP, GaAs, having a refractive index that is higher than that of the waveguide layer 7 is laminated so that the truncated conical hole 10 is covered with the transparent layer 11. Thus, a truncated cone part 10 is formed.

The surface of the transparent layer 11 is required to be polished so as to improve the flatness, which may be conducted until only the truncated cone part 10 is left. The transparent layer 11 is formed adjacent to the signal film 14 formed on the substrate disc 13 in a manner in which an air layer 12 having a thickness of δ between the transparent layer 11 and the signal film 14. Similar to a technique of a flying head used in a magnetic disc, the holder 3 is pressed on the disc substrate 13 rotating at high speed with the plate spring 2, and thereby the surface of the transparent layer 11 can stably be brought closer to the signal film 14 while holding a certain air gap δ (for example, δ is 50 nm or less).

The radiant light 4 that enters and transmits the parallel substrate 5 enters the waveguide layer 7 by way of the transparent layer 6 to excite the guided light 15 propagating from the periphery to the center by a concentric circular grating 6G. The conditions of this exciting is expressed by the following formula:

$$\sin\theta = \lambda/\Lambda - N \qquad \text{(Formula I)}$$

where $\Lambda$ is a pitch of the grating 6G; N is the equivalent refractive index; $\lambda$ is wavelength; and $\theta$ is an incident angle. In other words, the pitch $\Lambda$ is a function of the incident angle $\theta$, namely, radius r.

Moreover, among the incident light, the component that transmits the waveguide layer 7 is reflected from the reflective layer 9 and enters the waveguide layer 7 again, a part of which combines with the guided light. Consequently, the total incident efficiency is enhanced. The waveguide layer 7 cuts off at the center of the grating 6G and contacts with the truncated cone part 10 comprising a transparent material having a refractive index that is higher than that of the waveguide layer at this part. As a result, the guided light 15 that reaches the cutoff part is absorbed into the inside of the truncated cone part 10 from the waveguide layer 7 and turned into the light 16 that is collected around the optical axis L. A part of the light 16 leaks out as an evanescent light 17 from the surface of the transparent layer 11 by way of the opening 9A (the etched part of the reflective layer 9) of the bottom of the truncated cone part 10. When the evanescent light 17 is adjacent to the surface of the signal film 14, the light energy outflows to the signal film 14 or inflows to the waveguide layer in the form of the reflected light 18 from the signal film 14. In a case where the signal film 14 comprises materials in which the reflectance changes due to light or heat, a signal mark 19 can be recorded on the signal film 14 by the evanescent light 17. The signal mark 19 has a reflectance that is different from that of the surroundings. Moreover, since this photo detection is conducted in a confined space, detection sensitivity is good. Moreover, in this embodiment, the reflective layer 9 is used. However, instead of using the reflective layer 9, the film (mask layer) that changes from opaque to transparent due to irradiation with strong light may be formed over the entire surface of the transparent layer 8. Moreover, the mask layer may be formed on the transparent layer 11 of the above mentioned Embodiment. In any case, since the amount of the guided light 15 is small and the evanescent light is weak in the region away from the center, the mask layer is opaque and functions as a reflective layer. On the other hand, since the amount of the guided light 15 is increased and the evanescent light is strengthened in the vicinity of the center, the mask layer becomes transparent, and thereby the evanescent light 17 can be led to outside.

Moreover, the change in the state of the signal film 14 changes the amount of the evanescent light 17 that outflows to the signal film 14, and in turn changes the amount of the reflected light 18 that inflows from the signal film 14. The change of the condition of inflow and outflow of the light energy makes the light scatter in the vicinity of the photo detector 5D. This scattered light is detected. Therefore, the signal mark 19 can be detected by the photo detector SD. Moreover, the photo detection is conducted in a confined space, and the detection sensitivity is good.

Figure 2A:
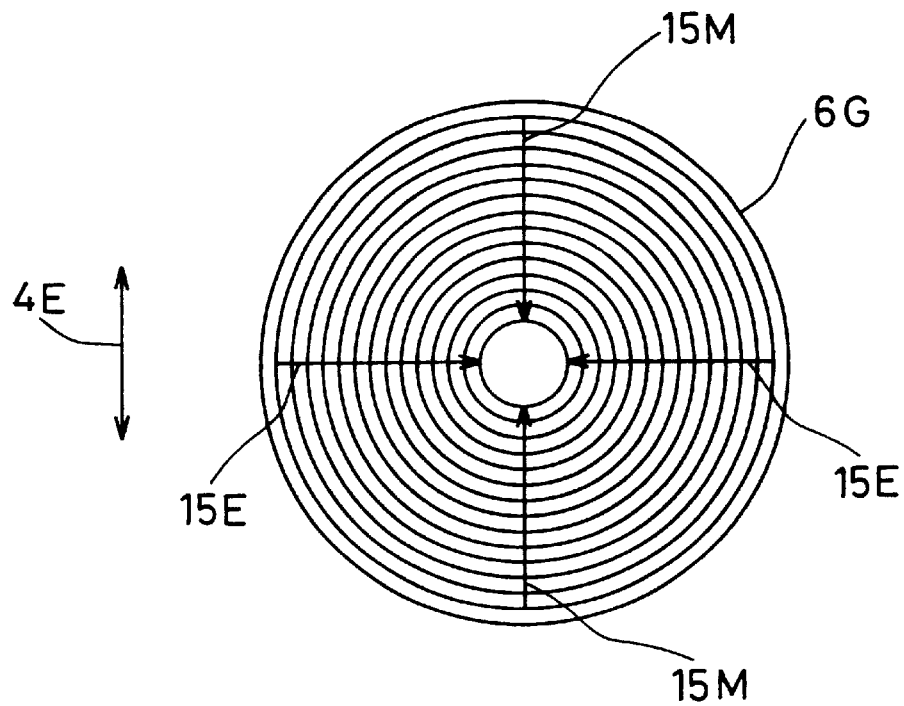
FIG. 2A is a plan view of a grating of the first embodiment of the present invention.
Figure 2B:
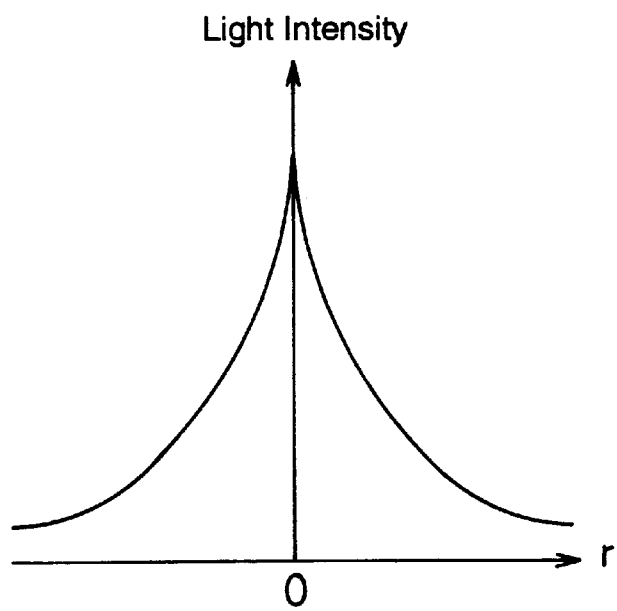
FIG. 2B is a graph of the light intensity distribution explaining the coefficiency of light utilization of the grating of the first embodiment of the present invention.

FIG. 2B is a graph showing the light intensity distribution explaining the coefficiency of light utilization of the first embodiment of the a present invention. FIG. 2A is a view of the grating 6G seen from the side of the radiation source. The light entering each portion of the grating 6G excites the guided light 15 (15E, 15M, etc.) propagating from the periphery to the center, respectively.

The conversion efficiency of the incident light to the guided light (the ratio of the amount of the incident light to the guided light at the central part) is more than 26% in experiment. If the efficiency of the reflection from the reflective layer 9 is included, the conversion efficiency is expected to be 40% or more. The reason why such a high efficiency can be obtained is that the pitch of the grating 6G satisfies the phase matching condition (formula 1) and the phase in which the entered guided light propagates to the next point matches the phase of the entered guided light at this point, so that the amount of the guided light is amplified in accordance with the propagation. In addition, since the propagation is convergent where the guided light propagates from the periphery to the center, the light intensity of the guided light 15 is increased as the light comes closer to the center.

FIG. 2B shows the light intensity distribution of the guided light at the cross section passing the center. It is thought that among the guided light at the central part (r=0) in which the light energy is collected the most, only about 10–20% of the guided light can be taken as the evanescent light 17. Therefore, the total coefficiency of light utilization of about $10^{-2}$ to $10^{-1}$ can be achieved, which is thousand to ten thousand times higher than that of the conventional technique. Moreover, in the first embodiment, the structure of the evanescent light radiation part has a facial extension. Consequently, the thermal concentration is not liable to occur and tolerance for the thermal damage is enhanced.

Figure 3A:
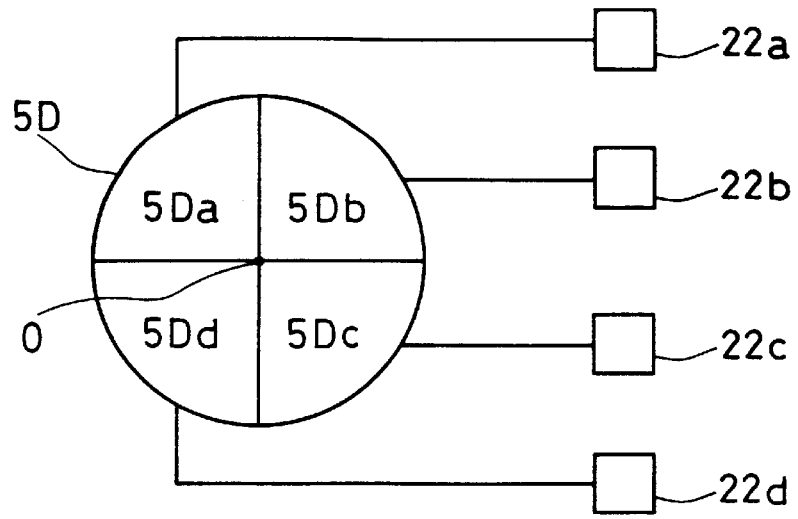
FIG. 3A is a plan view of a main part of a photo detector of the first embodiment of the present invention.
Figure 3B:
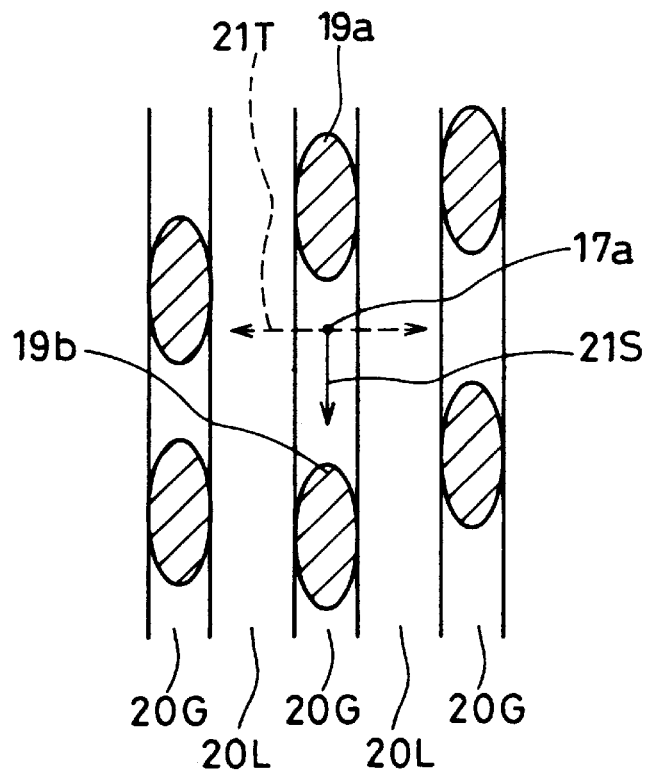
FIG. 3B is a plan view showing a structure of a signal surface of the first embodiment of the present invention.

FIG. 3A is a plan view showing a photo detector of the first embodiment of the present invention, and FIG. 3B is a plan view showing the structure of the signal surface seen from the side of the radiation source. On the signal surface, a convex part 20G and the concave part 20L form a convex and concave structure. The convex part 20G is adjacent to the surface of the transparent layer 11. The evanescent light radiation part 17a is located in the center of the convex part 20G. The location 17a moves in the direction of an arrow 21S of FIG. 3B by the rotation of the disc substrate 13.

The photo detector 5D is divided into four parts; 5Da, 5Db, 5Dc and 5Dd with a line that passes the center O and is parallel to the groove on the signal surface and a line that is perpendicular to the above mentioned line. Each of the divided photo detectors is wired to pads 22a, 22b, 22c and 22d by a metal film comprising, for example, Al. Thus, these pads hand the detected signals to the outside.

The amount of the light detected by the photo detector 5D is determined by the relationship of the location 17a of the evanescent light radiation part and a location of the signal mark 19. The location 17a passes over the signal mark 19a or 19b, and thereby the total amount of the light detected by 5Da, 5Db, 5Dc and 5Db is changed. Thus, the detected light can be taken as a reproducing signal of the signal mark. Moreover, (5Da+5Db)–(5Dc+5Dd) may be taken as are producing signal by using the fact that the distribution of the light entering the photo detector 5D is changed in accordance with the location of the signal mark. Similarly, since the distribution of the light entering the photo detector 5D is changed when the location 17a of the evanescent light displaces in the direction of an arrow 21T, (5Da+5Dd)–(5Db+5Dc) may be taken as a tracking error signal with respect to the groove 20G.

Moreover, if the deflection state of the incident light 4 is made to be a linear deflection and its electric vector is directed to the direction of an arrow 4E of FIG. 2A, the TE mode is excited in the direction of 15E, namely, the direction being perpendicular to the arrow 4E; and the TM mode is excited in the direction of 15M that is parallel to the arrow 4E. In the direction between them, both TE mode and TM mode are excited.

The equivalent refractive index N of the guided light is different in accordance with the guide mode. In general, the equivalent refractive index of the TE mode (the waveguide mode in which the electric vector of the guided light is parallel to the waveguide surface) is greater than the equivalent index of the TM mode (the waveguide mode in which the electric vector of the guided light is not parallel to the waveguide surface). Therefore, when the equivalent refractive index N of the guided light is equal to that of the TE mode, the guided light is not excited in the direction of 15M. When the equivalent refractive index N of the guided light is equal to that of the TM mode, the guided light is not excited in the direction of 15E. In order to excite the guided light in all the directions so as to increase the light entering efficiency, it is necessary to equalize the equivalent refractive index of TE mode and that of TM mode.

Second Embodiment

Figure 4A:
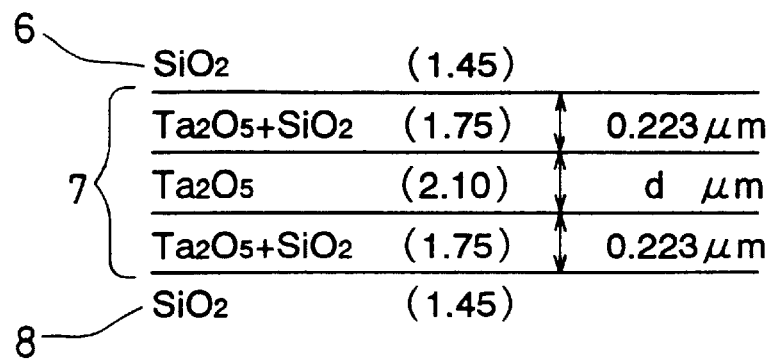
FIG. 4A is a view explaining a structure of a waveguide layer in terms of the composition, refractive index, and film thickness of each film.
Figure 4B:
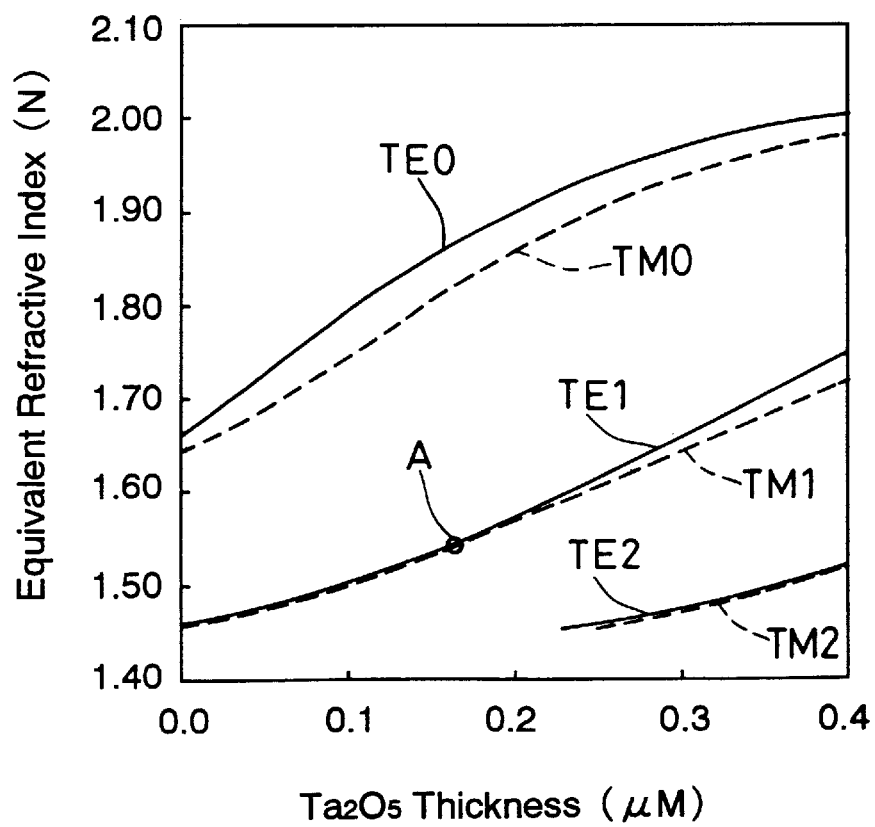
FIG. 4B is a graph showing an equivalent refractive index of the waveguide layer of the second embodiment of the present invention.

FIG. 4 A is a view explaining a structure of a waveguide layer in terms of the composition, refractive index, and film thickness of each film; and FIG. 4B is a graph showing an equivalent refractive index of the waveguide layer of this embodiment. In this embodiment, wavelength of the radiation source is set to be 0.78 μm. The second embodiment is the same as the first embodiment except for the structure of the waveguide layer 7. Therefore, the explanation for the same parts will be omitted.

In FIG. 4A, the waveguide layer 7 has a three-layered structure in which the film having a high refractive index of 2.10 is sandwiched by the films with a low refractive index of 1.75. The film with a refractive index of 2.10 can be formed by sputtering $Ta_2O_5$, etc. as a target. The film of refractive index of 1.76 can be formed by sputtering, for example, the mixed target of $Ta_2O_5$ and $SiO_2$.

In FIG. 4B, the vertical axis shows an equivalent refractive index and the horizontal axis shows the film thicknesses d of the film with a refractive index of 2.10. The refractive indices of the transparent layers 6 and 8 are set to be 1.45, respectively. The film thickness of both the upper and lower sides of the film with a refractive index of 1.75 are set to be 0.223 μm, respectively. When d is 0.16 μm, the equivalent refractive index of art TE 1 and that of TM 1 are equal (point A). Since the curve of TE 1 contacts with the curve of TM 1 in a manner that they come closer gradually, there is a tolerance for an error at d. Therefore, with the second embodiment of the present invention, the refractive index in a TE mode and that in a TM mode can be equalized. Thus, the coefficiency of light utilization can be improved as compared with the first embodiment.

Moreover, the waveguide layer may have a three-layered structure in which the low refractive index film is sandwiched by the high refractive index films.

Third Embodiment

Figure 5:
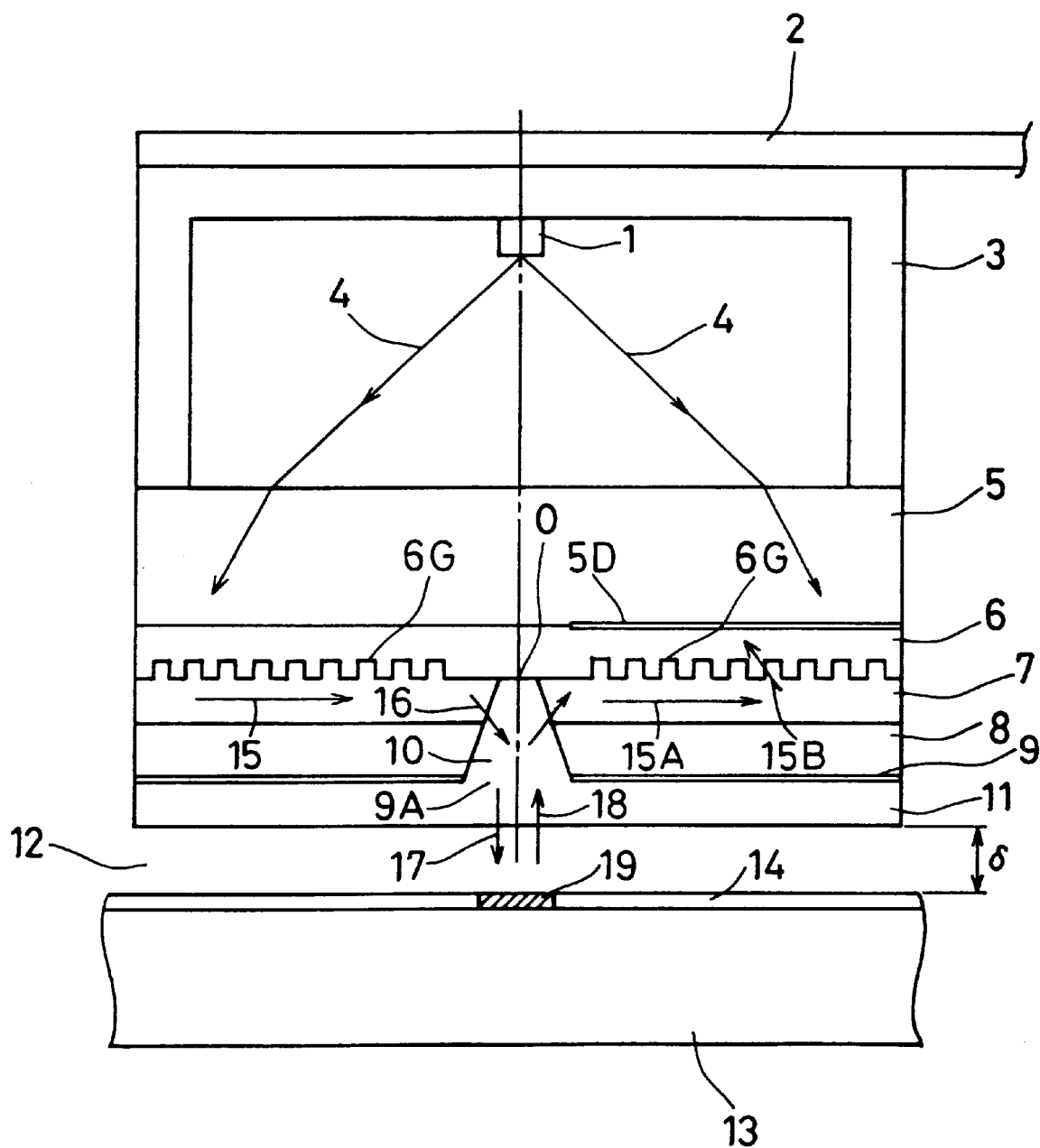
FIG. 5 is a cross sectional view showing a structure of an information recording and reproducing device of the third embodiment of the present invention.
Figure 6A:
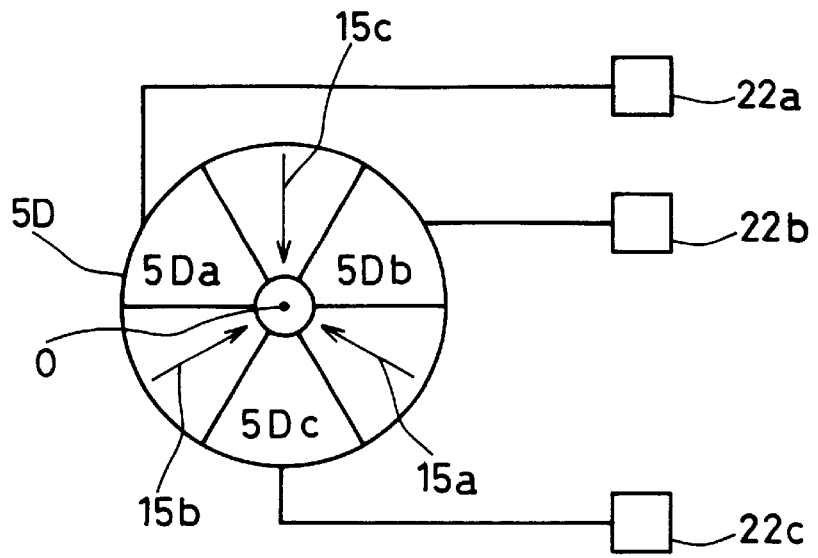
FIG. 6A is a plan view showing a main part of a photo detector of an information recording and reproducing device of the third embodiment of the present invention.
Figure 6B:
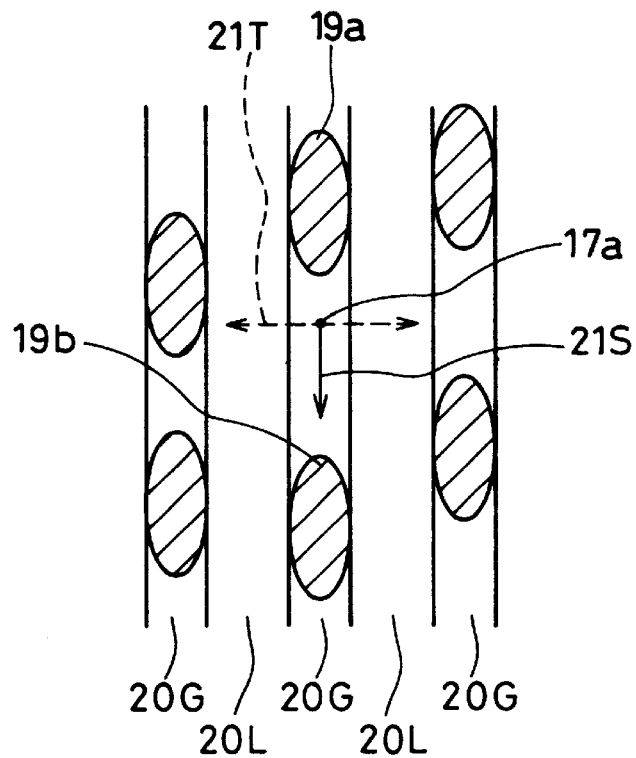
FIG. 6B is a plan view showing a structure of the signal surface of the third embodiment of the present invention.

Next, the present invention will be described by way of the third embodiment with reference to FIG. 5, FIGS. 6A and 6B, FIG. 5 is a cross sectional view showing a structure of an information recording and reproducing device of the third embodiment of the present invention. The third embodiment has the same structure as the first embodiment except for the structures of the grating and the photo detector. The explanation for the same parts will be omitted.

In FIG. 5, on the surface of the transparent substrate 5 provided with the photo detector 5D, the low refractive index transparent layer 6 comprising, for example, $SiO_2$ is formed. The concentric circular grating 6G having a center of the point O that is an intersection with an optical axis L is formed in the zonal region around the point O of the surface of the transparent layer 6. A waveguide layer 7 is formed on the transparent layer 6. Other structures including reflective layer 9, etc. is the same as in the first embodiment.

The light 4 that enters and transmits the parallel substrate 5 is blocked on the side on which the photo detector 5D is provided. However, on the side on which the photo detector 5D is not provided, the light 4 enters the waveguide layer 7 by way of the transparent layer 6 and excites the guided light 15 propagating from the periphery to the center O by the concentric circular grating 6G. Moreover, among the incident light, the component that transmits the waveguide layer 7 is reflected from the reflective layer 9 and enters the waveguide layer 7 again. And a part of the reflected light combines with the guided light. Thus, the total incident efficiency is enhanced.

The waveguide layer 7 cuts off at the central location of the grating 6G and contacts with the truncated cone part 10 comprising the transparent material having a refractive index that is higher than that of the waveguide layer at this part. Consequently, the guided light 16 that reaches the cutoff part is absorbed into the inside of the truncated cone part 10 from the waveguide layer 7 to form the light 16 converging around the axis L. A part of the light 16 leaks out as an evanescent light 17 from the surface of the transparent layer 11 by way of the opening 9A (an etched part of the reflective layer 9) at the bottom of the truncated cone part 10.

When the evanescent light 17 approaches to the signal film 14, the light energy outflows the signal film 14 or light energy inflows the waveguide layer in a form of the reflected light 18 from the signal film 14.

In a case where the signal film 14 is formed by materials in which the reflectance changes due to light or heat, the signal mark 19 having the reflectance that is different from that of surroundings can be recorded on the signal film 14 by the evanescent light 17. Moreover, the change in the state of the signal film 14 changes the outflow amount of the evanescent light 17 and in turn the amount of the reflected light 18 from the signal film 14. The change of the condition of the outflow-inflow of the light energy changes the intensity of the waveguide light 15A that slips through the cutoff part and moves from the center to the periphery (hereinafter, "feedback guided light" will be referred to), and thereby the intensity of the light 15B radiated to the side of the detector 5D is changed by the grating to 6G. Thus, the signal mark 19 can be detected by the photo detector 5D. Moreover, in this embodiment, the reflective layer 9 is used, the film (mask a layer) that changes from opaque to transparent due to irradiation with strong light may be formed all over the transparent layer 8 instead of using the reflective layer 9. Moreover, the mask layer may be formed on the transparent layer 11 of the above mentioned Embodiment. In any case, since the amount of the guided light 15 is small and its evanescent light is weak in the region away from the center, the mask layer is opaque and functions as a reflective layer. On the other hand, since the amount of the guided light 15 is increased and the evanescent light is also strengthened in the vicinity of the center, the mask layer becomes transparent. Thus, the evanescent light 17 can be led outside.

FIG. 6A is a plan view showing a photo detector of an information recording and reproducing device of the third embodiment of the present invention, and FIG. 6B is a plan view showing the structure of the light surface seen from the side of the radiation source. On the signal surface of the disc 13 in FIG. 6B, a convex part 20G and the concave part 20L form a concave and convex structure grooves. The convex part 20G is adjacent to the surface of the transparent layer 11. The evanescent light radiation part 17a is located in the center of the convex part 20G. The location 17a moves in the direction of an arrow 21S by rotation of the disc substrate 13.

As shown in FIG. 6A, the photo detector is provided in the three regions (5Da, 5Db, and 5Dc), which are located at every other region of six fan-shaped regions into which a circular photo detector is divided by lines passing the center O. Every detector is wired to the pads 22a, 22b, and 22c by a metal thin film comprising, for example, Al. These pads hand the detected signals to the outside. Since the incident light 4 is blocked in the region provided with the photo detector, the guided light is excited in the rest of fan-shaped regions like 15a, 15b, and 15c.

The guided light that does not leak out from the waveguide layer 7 at the cutoff part and transmits the cutoff part or the feedback guided light is reflected from the signal surface and fed back the waveguicle layer 7 is radiated to the photo detectors 5Da, 5Db, and 5Dc by the grating 6G at the location after transmitting the central portion O. The amount of the radiant light, namely, the amount of the light detected by the photo detector is determined by the relationship of the location of the evanescent light 17 and a location of the signal mark 19. The location 17a passes the signal mark 19a or 19b, and thereby the total amount of the light detected by 5Da, 5Db and 5Dc is changed. These detected light can be taken as a reproducing signal of the signal mark. Moreover, 5Da+5Db−5Dc may be taken as a reproducing signal by using the fact that the distribution of the feedback guided light is changed due to the location of the signal mark. Similarly, since the distribution of the feedback guided light is changed when the location 17a of the evanescent light displaces in the direction of an arrow 21T, 5Da−5Db may betaken as a tracking error signal.

Moreover, in the third embodiment, the other shapes of the photo detector may be employed. For example, the same effects can be obtained by using five fan-shaped regions, which are located every other region of ten fan-shaped regions into which a circular photo detector is divided by lines passing the center O.

Unlike the first embodiment, since the scattered light from the waveguide light that propagates to the center is not detected in the third embodiment, only the feedback guided light that propagates to the periphery can be detected. Therefore, as compared with the first embodiment, high quality signals can be reproduced.

Fourth Embodiment

Figure 7A:
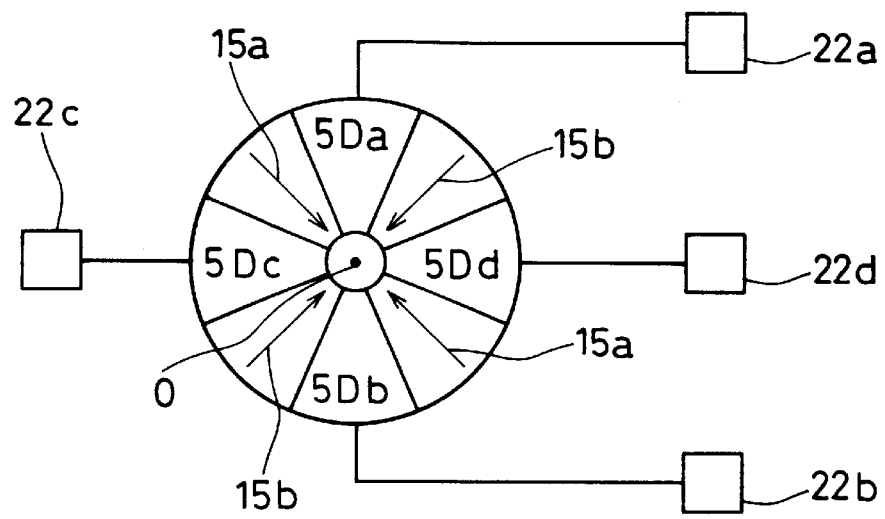
FIG. 7A is a plan view showing a main part of a photo detector of an information recording and reproducing device of the fourth embodiment of the present invention.
Figure 7B:
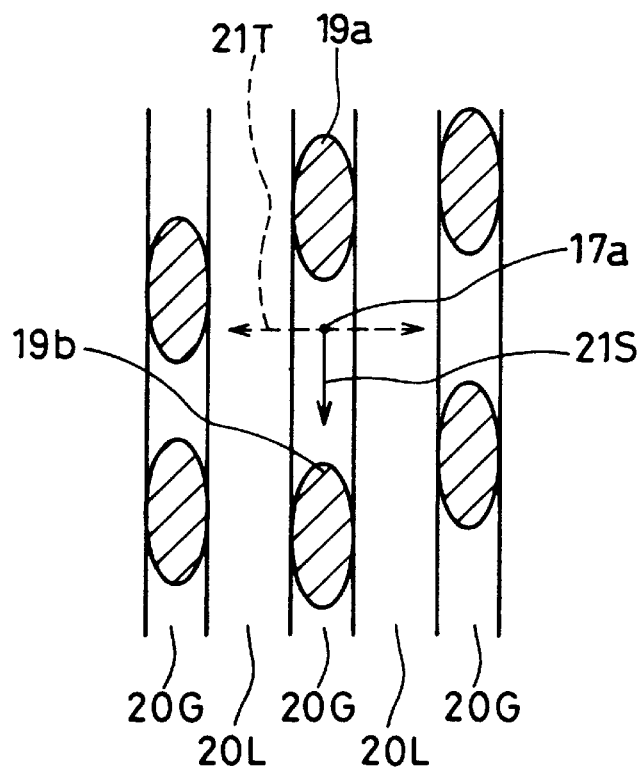
FIG. 7B is a plan view showing a structure of the signal surface of the fourth embodiment of the present invention.

FIG. 7A is a plan view showing a photo detector of an information recording and reproducing device of the fourth embodiment of the present invention, and FIG. 7B is a plan view showing a structure of the signal surface seen from the side of the radiation source. The fourth embodiment is the same as the third embodiment except for the structure of the photo detector. As a cross sectional view showing a structure, FIG. 5 shown in the third embodiment will be used. The explanation for the same parts will be omitted. In FIG. 7B, on the signal surface of the disc substrate 13, a convex part 20G and the concave part 20L form concave and convex structure grooves. The convex part 20G is adjacent to the surface of the transparent layer 11. The evanescent light radiation part 17a is located in the center of the convex part 20G. The location 17a moves in the direction of the arrow 21S by rotation of the disc substrate 13.

The photo detector is provided in four fan-shaped regions (5Da, 5Db, 5Dc and 5Dd), which are located at every other region of eight regions into which a circular photo detector is divided by the lines passing the center O. Every detector is wired to the pads 22a, 22b, 22c and 22d by a metal thin film comprising, for example, Al. These pads hand the detected signals to the outside. Since the incident light 4 is blocked in the region provided with the photo detector, the guided light is excited in the rest of the fan-shaped regions like 16a and 15b.

The guided light (feedback guided light) is reflected from the signal surface and fed back the waveguide layer 7 after it leaks out from the waveguide layer at the cutoff part. The guided light propagates to the periphery after passing the center O. In particular, the feedback waveguide light propagating in the direction of the photo detectors 5Da, 5Db, 5Dc, and 5Dd is radiated to the photo detector at this location by the grating 6G. The direction of the propagation of the feedback guided light is changed by the relationship of the location of the evanescent light 17 and the signal mark 19. Consequently, the location 17a passes the signal mark 19a or 19b, so that the total amount of light detected by 5Da, 5Db, 5Dc and 5Dd is changed. Thus, this can be taken as a reproducing signal of the signal mark. Moreover, by using the fact that if the location relationship of symmetrical lines of 5Dc and 5Dd arrange in the direction of the arrow 21S, the direction of propagation of the feedback guided light is changed in accordance with the location of the signal mark, 5Da–5Db may be taken as a reproducing signal. Similarly, since the direction of the propagation of the feedback guided light is changed when the location 17a of the evanescent light displaces in the direction of an arrow 21T, 5Dc–5Dd can be taken as a tracking error signal.

Moreover, in the fourth embodiment, the other shape of the photo detector may be employed. For example, the same effects can be obtained by using six fan-shaped regions, which are located every other region of twelve fan-shaped regions into which a circular photo detector is divided by lines passing the center O. In the fourth embodiment, since only the feedback guided light whose propagation direction is changed (in other words, only the component that is effected by the signal mark) is detected, high quality signal reproducing can be realized as compared with the third embodiment.

Fifth Embodiment

Figure 8:
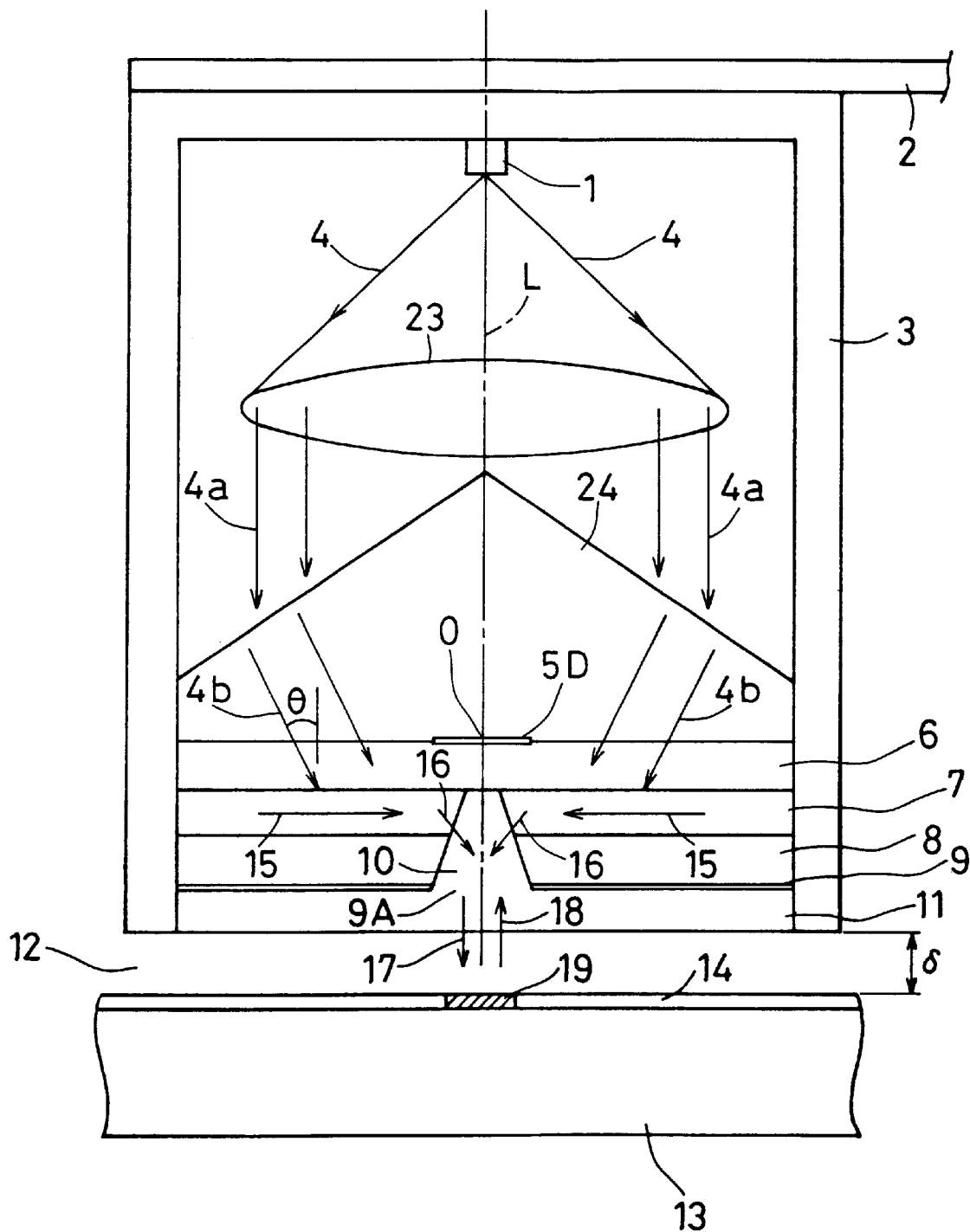
FIG. 8 is a cross sectional view showing a structure of an information recording and reproducing device of the fifth embodiment of the present invention.
Figure 9:
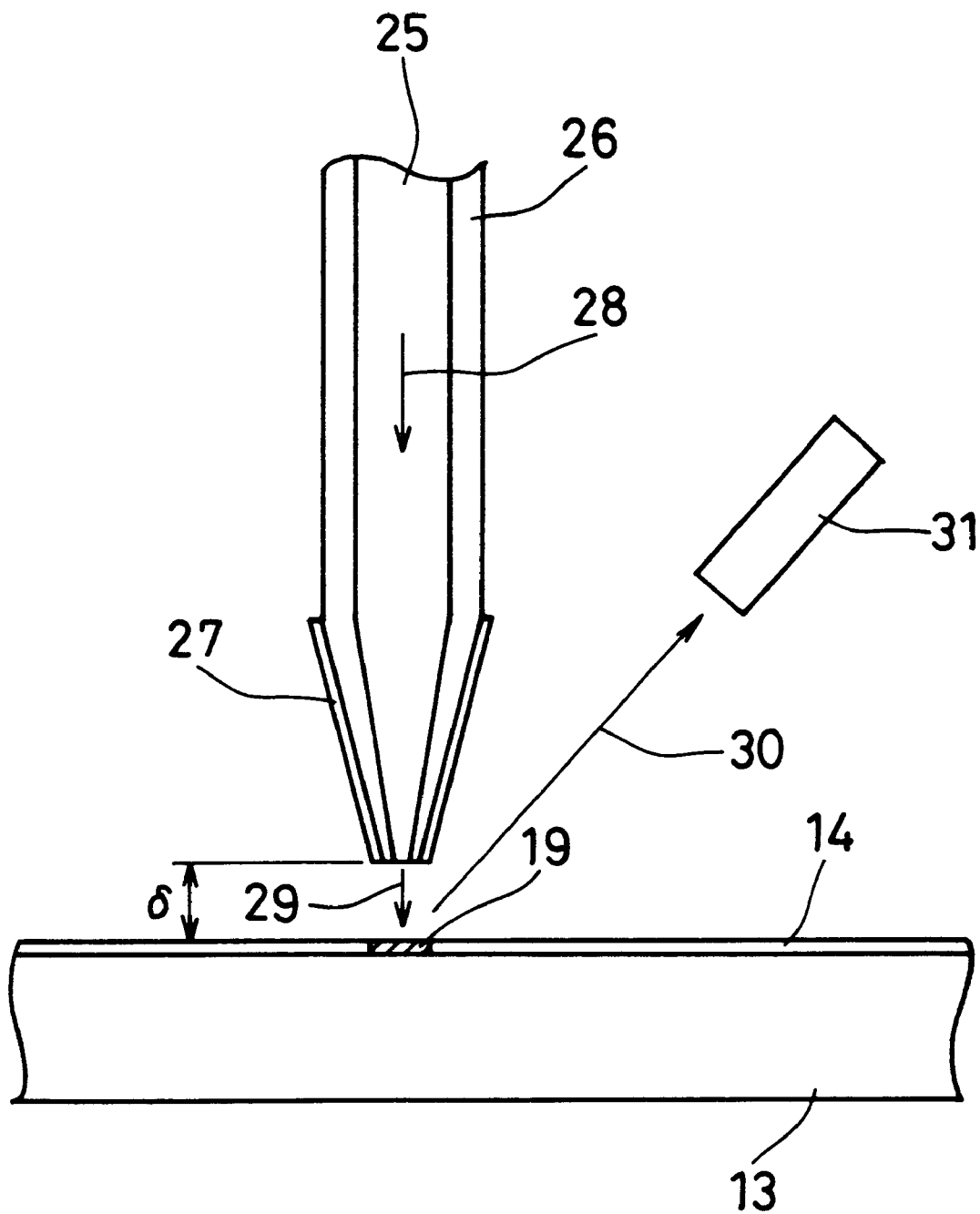
FIG. 9 is a cross sectional view showing a structure of a conventional information recording and reproducing device.
Figures 10A, 10B:
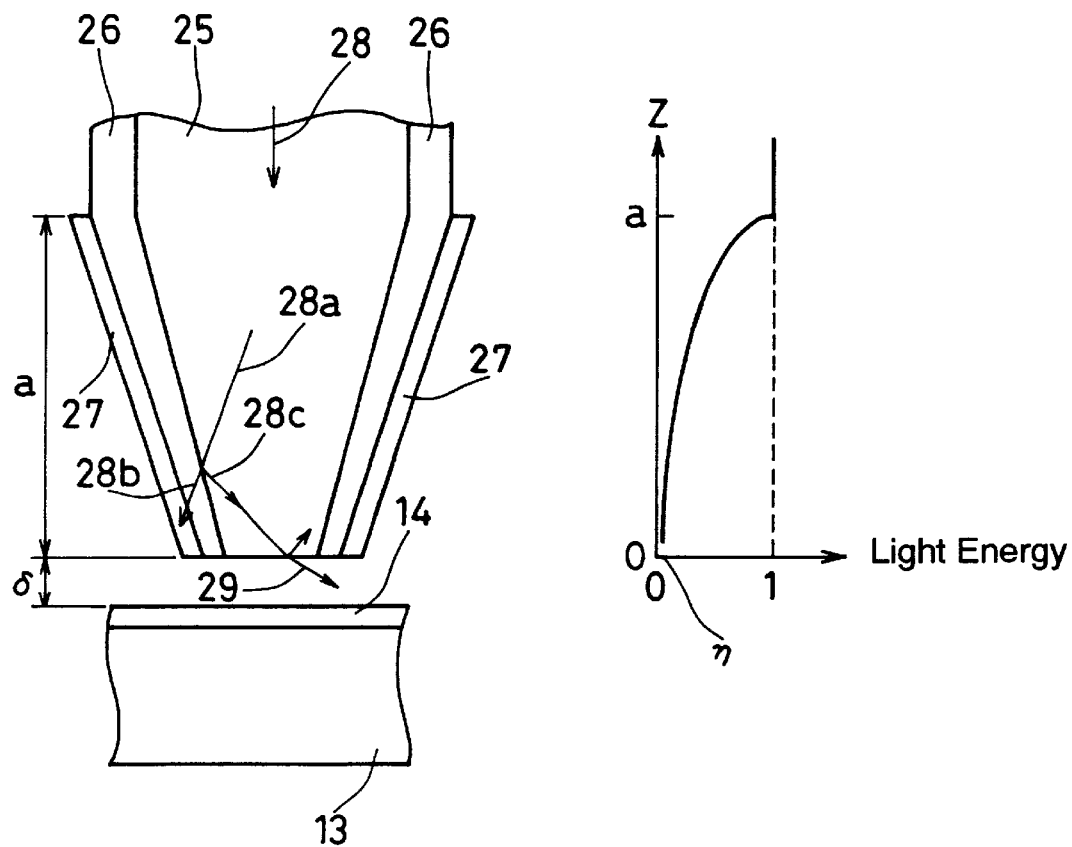
FIG. 10A is a cross sectional view of a main part of a conventional information recording and reproducing device.
FIG. 10B is a graph of the light energy distribution along the direction of the light propagation in the conventional device.

FIG. 8 is a cross sectional view showing a structure of an information recording and reproducing device of the fifth embodiment of the present invention. The fifth embodiment is the same as the first embodiment except for the structure of the photo coupling means. Therefore, the explanation for the same parts will be omitted. In FIG. 8, a radiation source 1, for example, a semiconductor laser, is fixed in a holder 3 provided on the tip of a plate spring member 2. From the radiation source 1, light 4 with an axis L as an optical axis is radiated. To the holder 3, a collimating lens 23 and a conical lens 24 are provided in a manner in which both are in the concentric circular with respect to the optical axis L.

The refractive index of the conical lens 24 is higher than that of the below mentioned waveguide layer 7. On the lower surface of the conical lens, the photo detector 5D is formed in the circular region having a diameter of several tens of μm and a point O that is an intersection with the optical axis. On the lower surface of the conical lens, a waveguide layer 7 is formed in a manner that a low refractive index transparent layer 6 comprising, for example, $SiO_2$ is sandwiched by the substrate 5 and the waveguide layer 7. The other structures are the same as the first embodiment. Therefore, the explanation will be omitted.

The light 4a that is made to be parallel by the collimating lens 23 becomes light 4b having a conical wave surface by being refracted at the cone surface of the conical lens 24, enters the waveguide layer 7 by way of the transparent layer 6. In a case where the transparent layer 6 is substantially thin, it excites the waveguide light 15 that propagates from the periphery to the center. The condition of this exciting is expressed by the following formula 2:

$$n \sin \theta = N \qquad \text{(Formula 2)}$$

where n is the refractive index of the conical lens 24, N is the equivalent refractive index, λ is wavelength, and θ is an incident angle.

The fifth embodiment is the same as the first embodiment except for the formation of the light coupling means that input the light into the waveguide layer. In other wards, the light coupling means is the grating 6G in the first embodiment, and it is the conical lens 24 in the fifth embodiment. Therefore, similar to the first embodiment, signals can be recorded and reproduced on the signal surface, and the optical input by the use of the prism (conical lens) exhibits the higher efficient than the optical input by the grating. As a result, in this embodiment, higher coefficiency of light utilization can be achieved than the first embodiment.

Moreover, since the structure of the evanescent light radiation part has a facial extension similar to the first embodiment, the tolerance for the thermal damage can be realized. Needless to say, as in the first embodiment, the mask layer may be used instead of the reflective layer 9. And the mask layer may be formed on the transparent layer 11. Furthermore, the same effect can be obtained in a case where the three-layered waveguide layer shown in the second embodiment or the detecting method shown in the third and fourth embodiments can be employed. On the other hand, in the first to fourth embodiments, the method of making light parallel by the collimating lens and inputting it into the grating as in the fifth embodiment may be employed.

Moreover, as a method for detecting signals, there is a method using the change in the luminescence property in accordance with fluctuate of the amount of the feedback light to the radiation source. In this case, the detector 5D used in the first to the fifth embodiments is not necessary. Instead, the amount of the feedback light, namely, existence and nonexistence of signals can be confirmed by monitoring the luminescence property of the radiation source.

Moreover, in order to achieve the isotropic light coupling, the following method is possible: the light from the radiation source is converted into a circular polarization by using a ¼ wavelength plate and entered the waveguide layer. In the method, in order to reduce the process, the formation of the reflective layer 9 may be omitted. The grating 6G may be formed on the surface of the waveguide layer.

Moreover, the cutoff part of the waveguide layer is not limited as long as it has a function that enables the guided light that propagates from the periphery to the center to leak out to the side of the signal surface. The other shapes of the photo detector may be employed. For example, the shape of the truncated cone part 10 may be the shape that tapers in the direction of the signal surface. Also, as a material to cover the truncated cone part, a material having a refractive index that is higher than that of the waveguide layer may be employed.

Moreover, the signal surface may be formed by a film used for the optical disc. Moreover, the signal surface in which the structure of each embodiment is replaced.

Moreover, in the first to the fifth embodiments, the waveguide layer is formed on the flat surface. However, the waveguide layer may be formed on a curve surface. For example, a waveguide layer may be formed on the cone face and a cutoff part may be formed on the top of the cone part.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. An optical device for recording/reproducing data on a signal/data recording surface, comprising a radiation source, a transparent substrate, a waveguide layer provided on the surface of said transparent substrate opposite to said radiation source, and an optical coupling means provided on at least one surface selected from the group consisting of the surface of said waveguide layer and an interface located between said transparent substrate and said waveguide layer, the optical coupling means having a concentric circular periodic structure with an optical axis of said radiation source in the center; wherein said waveguide layer has a cutoff part at the center of said periodic structure; the light from said radiation source excites a guided light that propagates from the periphery to the center of the periodic structure in the waveguide layer by said optical coupling means; and a part of said guided light that reaches said cutoff part leaking out from said optical device to the signal/data recording surface on a flat substrate provided not in contact with but adjacent to said waveguide layer.

2. The optical device according to claim 1, wherein said transparent substrate is fixed in the same structure as said radiation source, said structure moves relative to said signal/data recording surface while being pressed thereon by a pressing means, and said structure floats while facing to said signal/data recording surface having an air layer between said surface of the waveguide layer and said signal/data recording surface.

3. The optical device according to claim 1, wherein a first transparent layer having a refractive index that is lower than that of said waveguide layer is laminated on said waveguide layer.

4. The optical device according to claim 3, wherein a reflective layer is laminated on said first transparent layer except for said cutoff part.

5. The optical device according to claim 3, wherein a mask layer that changes from opaque to transparent due to irradiation with strong light is laminated on said first transparent layer.

6. The optical device according to claim 1, wherein said cutoff part is covered with a second transparent layer having a refractive index that is higher than that of said waveguide layer, and the guided light in said waveguide layer leaks out to the side of said signal/data recording surface through said second transparent layer said cutoff part.

7. The optical device according to claim 6, wherein a mask layer that changes from opaque to transparent due to irradiation with strong light is laminated on said second transparent layer.

8. The optical device according to claim 6, wherein the shape of said cutoff part is at least one shape selected from the group consisting of a cone and a truncated cone each of which has said optical axis as a central axis.

9. The optical device according to claim 1, wherein signal marks are recorded on said signal/data recording surface by the light that leaks out from said waveguide layer to the side of said signal/data recording surface at said cutoff part.

10. The optical device according to claim 1, wherein a photo detector is provided on or in the vicinity of said transparent substrate, a part of the light leaking out from said waveguide layer to the side of said signal/data recording surface and being reflected from said signal/data recording surface is detected by said photo detector, and signals formed on said signal/data recording surface are reproduced.

11. The optical device according to claim 10, wherein said photo detector is divided into equal parts by dividing lines being perpendicular to the direction in which said signal/data recording surface moves, and a differential signal between said equal parts is taken as a reproduced signal.

12. The optical device according to claim 10, wherein a concave and convex structure is formed on said signal/data recording surface along the direction in which said signal/data recording surface moves, said photo detector is divided into equal parts by dividing lines along said direction, and a differential signal between said equal parts is taken as a tracking control signal.

13. The optical device according to claim 1, wherein the photo detector is provided on or in the vicinity of said transparent substrate, the light that leaks out at said cutoff part from said waveguide layer to the side of said signal/data recording surface is reflected from said signal surface and enters said waveguide layer again to form the guided light propagating from the center to the periphery of the periodic structure in said waveguide layer, at least one light selected from the group consisting of said guided light and the light released from said waveguide layer is detected by said photo detector, and signals formed on said signal surface are reproduced.

14. The optical device according to claim 13, wherein said photo detector comprises two parts that sandwich a line being perpendicular to the direction in which said signal/data recording surface moves, and the differential signal between said two photo detectors is taken as a reproducing signal.

15. The optical device according to claim 13, wherein a concave and convex structure is formed on said signal surface along the direction in which said signal/data recording surface moves, said photo detector comprises two parts being symmetric with respect to a line along said direction, and the differential signal between said two detectors is taken as a tracking control signal.

16. The optical device according to claim 1, wherein the light that leaks out from said waveguide layer to the side of said signal/data recording surface at said cutoff part is reflected from said signal/data recording surface and enters said waveguide layer again to form the guided light propagating from the center to the periphery of the periodic structure in said waveguide layer, said guided light feeds back said radiation source and causes the change in the drive performance of said radiation source, the change is detected, and signals formed on said signal/data recording surface are reproduced.

17. The optical device according to claim 1, wherein said waveguide layer comprises a multilayer film, and the refractive index of the guided light that propagates in the waveguide layer is substantially equal in a TE mode and TM mode.

18. The optical device according to claim 17, wherein the multilayer film constituting said waveguide layer has a three-layer structure in which the transparent layer with a high refractive index is sandwiched between the transparent layers with a low refractive index.

19. The optical device according to claim 17, wherein the multilayer film constituting said waveguide layer has a three-layer structure in which the transparent layer with a low refractive index is sandwiched between the transparent layers with a high refractive index.

20. An optical device for recording/reproducing data on a signal/data recording surface, comprising a radiation source, a light collecting means that converts light radiated from said radiation source to a parallel light, a transparent cone part having an optical axis of said parallel light as a central axis, a transparent buffer layer formed on the lower surface of said cone part, a waveguide layer formed on said buffer layer; wherein said waveguide layer has a cutoff part at the central axis of said cone part; the refractive index of said cone part is larger than the refractive index of said waveguide layer, which is larger than the refractive index of said buffer layer; said parallel light is refracted at the surface of said cone part, passes through said buffer layer and enters said waveguide layer to excite a guided light that propagates from the periphery to the center in said waveguide layer; and a part of said guided light that reaches said cutoff part leaking out from said optical device to the signal/data recording surface on a flat substrate provided not in contact with but adjacent to said waveguide layer.

21. The optical device according to claim 20, wherein said cone part is fixed in the same structure as said radiation source, said structure moves relative to said signal/data recording surface while being pressed thereon means by a pressing means, and said structure floats while facing to said signal/data recording surface having an air layer between said surface of the waweguide layer and said signal/data recording surface.

22. The optical device according to claim 21, wherein said cutoff part is covered with a second transparent layer having a refractive index that is higher than that of said waveguide layer, and the guided light in said waveguide layer leaks out to the side of said signal/data recording surface through said second transparent layer at said cutoff part.

23. The optical device according to claim 22, wherein a mask layer that changes from opaque to transparent due to irradiation with strong light is laminated on said second transparent layer.

24. The optical device according to claim 22, wherein the shape of said cutoff part is at least one shape selected from the group consisting of a cone and a truncated cone each of which has said optical axis as a central axis.

25. The optical device according to claim 20, wherein a first transparent layer having a refractive index that is lower than that of said waveguide layer is laminated on said waveguide layer.

26. The optical device according to claim 25, wherein a reflective layer is laminated on said first transparent layer except for said cutoff part.

27. The optical device according to claim 25, wherein a mask layer that changes from opaque to transparent due to irradiation with strong light is laminated on said first transparent layer.

28. The optical device according to claim 20, wherein signal marks are recorded on said signal surface by the light that leaks out from said waveguide layer to the side of said signal/data rercording surface at said cutoff part.

29. The optical device according to claim 28, wherein a concave and convex structure is formed on said signal/data recording surface along the direction in which said signal/data recording surface moves, said photo detector comprises two parts being a symmetric with respect to a line along said direction, and the differential signal between said two detectors is taken as a tracking control signal.

30. The optical device according to claim 20, wherein a photo detector is provided on or in the vicinity of said transparent substrate, a part of the light leaking out from said waveguide layer to the side of said signal/data recording surface and being reflected from said signal/data recording surface is detected by said photo detector, and signals formed on said signal/data recording surface are reproduced.

31. The optical device according to claim 30, wherein said photo detector is divided into equal parts by dividing lines being perpendicular to the direction in which said signal/data recording surface moves, and a differential signal between said equal parts is taken as a reproduced signal.

32. The optical device according to claim 30, wherein concave and convex structure is formed on said signal/data recording surface along the direction in which said signal/data recording surface moves, said photo device is divided into equal parts by dividing lines along said direction, and a differential signal between said equal parts is taken as a tracking control signal.

33. The optical device according to claim 20, wherein the photo detector is provided on or in the vicinity of the bottom part of said cone part, the light that leaks out at said cutoff part from said waveguide layer to the side of said signal/data recording surface is reflected from said said signal/data recording surface and enters said waveguide layer again to form the guided light propagating from the center to the periphery of the periodic structure in said waveguide layer, at least one light selected from the group consisting of said guided light and light released from said waveguide layer is detected by said photo detector, and signals formed on said signal/data recording surface are reproduced.

34. The optical device according to claim 33, wherein said photo detector comprises two parts that sandwich a line being perpendicular to the direction in which said signal/data recording surface moves, and the differential signal between said two photo detectors is taken as a reproducing signal.

35. The optical device according to claim 20, wherein the light that leaks out from said waveguide layer to the side signal/data recording surface at said cutoff part is reflected from said signal/data recording surface and enters said waveguide layer again to form the guided light propagating form the center to the periphery of the periodic structure in said waveguide layer, said guided light feeds back said radiation source and causes the change in the drive performance of said radiation source, the change is detected, and signals formed on said signal/data recording surface are reproduced.

36. The optical device according to claim 20, wherein said waveguide layer comprises a multilayer film, and the refractive index of the guided light that propagates in the waveguide layer is substantially equal in a TE mode and TM mode.

37. The optical device according to claim 36, wherein the multilayer film constituting said waveguide layer has a three-layer structure in which the transparent layer with a high refractive index is sandwiched between the transparent layers with a low refractive index.

38. The optical device according to claim 36, wherein the multilayer film constituting said waveguide layer has a three-layer structure in which the transparent layer with a low refractive index is sandwiched between the transparent layers with a high refractive index.

39. An optical information recording and reproducing device for recording/reproducing data on a signal/data recording surface, comprising a radiation source, a transparent substrate, a waveguide layer provided on the surface of said transparent substrate opposite to said radiation source and an optical coupling means provided on a surface selected from the group consisting of the surface of said waveguide layer and the interface located between said transparent substrate and said waveguide layer, the optical coupling means having a concentric circular periodic structure with an optical axis of said radiation source in the center; wherein said waveguide layer has a cutoff part at the center of said periodic structure; the light from said radiation source excites a guided light that propagates from the periphery to the center of the periodic structure in the waveguide layer by said optical coupling means; and a part of said guided light that reaches said cutoff part leaking out from said optical device to the signal/data recording surface on a flat substrate provided not in contact with but adjacent to said waveguide layer.

40. The optical information recording and reproducing device according to claim 39, wherein said transparent substrate is fixed in the same structure as said radiation source, said structure moves relative said signal/data recording surface while being pressed thereon by a pressing means, and said structure floats while facing to said signal surface having an air layer between said surface of the waveguide layer and said signal/data recording surface.

41. The optical information recording and reproducing device according to claim 39, wherein a first transparent layer having a refractive index that is lower than that of said waveguide layer is laminated on said waveguide layer.

42. The optical information recording and reproducing device according to claim 41, wherein a reflective layer is laminated on said first transparent layer except for said cutoff part.

43. The optical information recording and reproducing device according to claim 39, wherein said cutoff part is covered with a second transarent layer having a refractive index that is higher than that waveguide layer, and the guided light in said waveguide layer leaks out to the side of said signal/data recording surface through said second transparent layer at said cutoff part.

44. The optical information recording and reproducing device according to claim 43, wherein the shape of said cutoff part is at least one shape selected from the group consisting of a cone and a truncated cone each of which has said optical axis as a central axis.

45. The optical information recording and reproducing device according to claim 39, wherein signal marks are recorded on said signal/data recording surface by the light that leaks out from said waveguide layer to the side of said signal/data recording surface at said cutoff part.

46. The optical information recording and reproducing device according to claim 39, wherein a photo detector is provided on or in the vicinity of said said transparent substrate, a part of the light leaking out from said waveguide layer to the side of said signal/data recording surface and being reflected from said signal/data recording surface is detected by said photo detector, and signals formed on said signals/data recording surface are reproduced.

47. The optical information recording and reproducing device according to claim 46, wherein said photo detector is divided into equal parts by dividing lines being perpendicular to the direction in which said signal/data recoding surface moves, and a differential signal between said equal parts is taken as a reproduced signal.

48. The optical information recording and reproducing device according to claim 46, wherein concave and convex structure is formed on said signal/data recording surface along the direction in which said signal/data recording surface moves, said photo detector is divided into equal parts by dividing lines along said direction, and a differential signal between said equal parts is taken as a tracking control signal.

49. The optical information recording and reproducing device according to claim 39, wherein the photo detector is provided on or in the vicinity of said transparent substrate, the light that leaks out at said cutoff part from said signal/data recording surface and enters said waveguide layer again to form the guided light propagating from the center to the periphery of the periodic structure in said waveguide layer, at least one light selected from the group consisting of said guided light and the light released from said waveguide layer is detected by said photo detector, and signals formed on said signal/data recording surface are reproduced.

50. The optical information recording and reproducing device according to claim 49, wherein said photo detector comprises two parts that sandwich a line being perpendicular to the direction in which said signal/data recording surface moves, and the differential signal between said two photo detectors is taken as a reproducing signal.

51. The optical information recording and reproducing device according to claim 49, wherein a concave and convex structure is formed on said signal/data recording surface along the direction in which said signal/data recording surface moves, said photo detector comprises two parts being symmetric with respect to a line along said direction, and the differential signal between said two detectors is taken as a tracking control signal.

52. The optical information recording and reproducing device according to claim 39, wherein the light that leaks out from said waveguide layer to said signal/data recording surface at said cutoff part is reflected from said signal/data recording surface and enters said waveguide layer again to form the guided light propagating from the center to the periphery of the periodic structure in said waveguide layer, said guided light feeds back said radiation source and causes the change in the drive performance of said radiation source, the change is detected, and signals formed on said signal/data recording surface are reproduced.

53. The optical information recording and reproducing device according to claim 39, wherein said waveguide layer comprises a multilayer film, and the refractive index of the guided light that propagates in the waveguide layer is substantially equal in a TE mode and TM mode.

54. The optical information recording and reproducing device according to claim 53, wherein the multilayer film constituting said waveguide layer has a three-layer structure in which the transparent layer with a high refractive index is sandwiched between the transparent layers with a low refractive index.

55. The optical information recording and reproducing device according to claim 53, wherein the multilayer film constituting said waveguide layer has a three-layer structure in which the transparent layer with a low refractive index is sandwiched between the transparent layers with a high refractive index.

56. An optical information recording and reproducing device for recording/reproducing data on a signal/data recording surface, comprising a radiation source, a light collecting means that converts light radiated from said radiation source to a parallel light, a transparent cone part having an optical axis of said parallel light as a central axis, a transparent buffer layer formed on the lower surface of said cone part, a waveguide layer formed on said buffer layer; wherein said waveguide layer has a cutoff part at the central axis of said cone part; the refractive index of said cone part is larger than the refractive index of said waveguide layer, which is larger than the refractive index of said buffer layer; said parallel light is refracted at the surface of said cone part, passes through said buffer layer and enters said waveguide layer to excite the guided light that propagates from the periphery to the center in said waveguide layer; and a part of said guided light that reaches said cutoff part leaking out from said optical device to the signal/data recording surface on a flat substrate provided not in contact with but adjacent to said waveguide layer.

57. The optical information recording and reproducing device according to claim 56, wherein said cone part is fixed in the same structure said radiation source, said structure moves relative to said signal/data recording surface while being pressed thereon by a pressing means, and said structure floats while facing to said signal/data recording surface having an air layer between said surface of the waveguide layer and said signal/data recording surface.

58. The optical information recording and reproducing device according to claim 56, wherein a first transparent layer having a refractive index that is lower than that of said waveguide layer is laminated on said waveguide layer.

59. The optical information recording and reproducing device according to claim 58, wherein a reflective layer is laminated on said first transparent layer except for said cutoff part.

60. The optical information recording and reproducing device according to claim 56, wherein said cutoff part is covered with a second transparent layer having a refractive index that is higher than that of said waveguide layer, and the guided light in said waveguide layer leaks out to the side of said signal/data recording surface through said second transparent layer at said cutoff part.

61. The optical information recording and reproducing device according to claim 60, wherein the shape of said cutoff part is at least one shape selected from the group consisting of a cone and a truncated cone each of which has said optical axis as a central axis.

62. The optical information recording and reproducing device according to claim 56, wherein signal marks are recorded on said signal/data recording surface by the light that leaks out from said waveguide layer to the side of said signal/data recording surface at said cutoff part.

63. The optical information recording and reproducing device according to claim 56, wherein a photo detector is provided on or in the vicinity of said transparent substrate, a part of the light leaking out from said waveguide layer to the side of said signal/data recording surface and being reflected from said signal/data recording surface is detected by said photo detector, and signals formed on said signal/data recording surface are reproduced.

64. The optical information recording and reproducing device according to claim 63, wherein said photo detector is divided into equal parts by dividing lines being perpendicular to the direction in which said signal surface/data recording surface moves, and a differential signal between said equal parts is take as a reproduced signal.

65. The optical information recording and reproducing device according to claim 63, wherein concave and convex structure is formed on said signal/data recording surface along the direction in which said signal/data recording surface moves, said photo detector is divided into equal parts by dividing lines along said direction, and a differential signal between said equal parts is taken as a tracking control signal.

66. The optical information recording and reproducing device according to claim 56, wherein the photo detector is provided on or in the vicinity of the the lower part of said cone part, the light that leaks out at said cutoff part from said waveguide layer to the side of said signal/data recording surface is reflected from said signal/data recording surface and enters said waveguide layer again to form the guided light propagating from the center to the periphery of the periodic structure in said waveguide layer, at least one light selected from the group consisting of said guided light and the light released from said waveguide layer is detected by said photo detector, and signals formed on said signal surface are reproduced.

67. The optical information recording and reproducing device according to claim 66, wherein said photo detector comprises two parts, that sandwich a line being perpendicular to the direction in which said signal/data recording surface moves, and the differential signal between said two photo detectors is taken as a reproducing signal.

68. The optical information recording and reproducing device according to claim 66, wherein a concave and convex structure is formed on said signal/data recording surface along the direction in which said signal/data recording surface moves, said photo detector comprises two parts being symmetric with respect to a line along said direction, and the differential signal between said two detectors is taken as a tracking control signal.

69. The optical information recording and reproducing device according to claim 56, wherein the light that leaks out from said waveguide layer to said signal/data recording surface at said cutoff part is reflected from said signal/data recording surface and enters said waveguide layer again to form the guided light propagating from the center to the periphery of the periodic structure in said waveguide layer, said guided light feeds back said radiation source and causes the change in the drive performance of said radiation source, the change is detected, and signals formed on said signal/data recording surface are reproduced.

70. The optical information recording and reproducing device according to claim 56, wherein said waveguide layer comprises a multilayer film, and the refractive index of the guided light that propagates in the waveguide layer is substantially equal in a TE mode and TM mode.

71. The optical information recording and reproducing device according to claim 70, wherein the multilayer film constituting said waveguide layer has a three-layer structure in which the transparent layer with a high refractive index is sandwiched between the transparent layers with a low refractive index.

72. The optical information recording and reproducing device according to claim 70, wherein the multilayer film constituting said waveguide layer has a three-layer structure in which the transparent layer with a low refractive index is sandwiched between the transparent layers with a high refractive index.

* * * * *